United States Patent [19]
Lewis et al.

[11] Patent Number: 5,522,605
[45] Date of Patent: Jun. 4, 1996

[54] COLLET CHUCK HAVING PARPALLEL FORCE LOADED BEARING

[75] Inventors: David L. Lewis; Keith Wiggins, both of Raleigh, N.C.

[73] Assignee: Kennametal Inc., Latrobe, Pa.

[21] Appl. No.: 288,524

[22] Filed: Aug. 10, 1994

[51] Int. Cl.⁶ .................................... B23B 31/20
[52] U.S. Cl. ................. 279/49; 279/56; 279/157
[58] Field of Search .................... 279/42, 48, 49, 279/52, 56, 43, 50, 51, 57, 47, 43.9, 46.9, 157

[56] References Cited

U.S. PATENT DOCUMENTS

| | | | |
|---|---|---|---|
| 2,228,685 | 1/1941 | Benjamin | 279/49 |
| 2,345,069 | 3/1944 | Phillips | 279/49 |
| 2,358,299 | 9/1944 | Benjamin et al. | 279/49 |
| 2,358,300 | 9/1944 | Benjamin et al. | 279/49 |
| 2,775,094 | 12/1956 | Buckland et al. | 60/39.65 |
| 2,778,651 | 1/1957 | Benjamin et al. | 279/47 |
| 2,893,743 | 7/1959 | Ondeck | 279/9 |
| 3,035,845 | 5/1962 | Benjamin | 279/47 |
| 3,132,871 | 5/1964 | Stewart | 279/49 |
| 3,195,909 | 7/1965 | Winnen | 279/51 |
| 3,210,088 | 10/1965 | Williamson et al. | 279/4 |
| 3,365,204 | 1/1968 | Benjamin et al. | 279/51 |
| 3,425,705 | 2/1969 | Benjamin et al. | 279/56 |
| 3,556,540 | 1/1971 | Benjamin et al. | 279/47 |
| 3,615,100 | 10/1971 | Banner | 279/4 |
| 3,652,100 | 3/1972 | Baturka | 279/51 |
| 3,671,050 | 6/1972 | Andersson et al. | 279/47 |
| 3,727,928 | 4/1973 | Benjamin | 279/1 L |
| 3,810,641 | 5/1974 | Benjamin | 279/51 |
| 5,022,278 | 6/1991 | DeCaussin | 74/110 |
| 5,074,723 | 12/1991 | Massa et al. | 409/131 |
| 5,193,825 | 3/1993 | Kanaan et al. | 279/48 |

*Primary Examiner*—Steven C. Bishop
*Attorney, Agent, or Firm*—James G. Porcelli

[57] ABSTRACT

A collet chuck 1 having a chuck body 3, a collet 11 disposed in the body 3, a nose ring 23 for radially compressing the collet 11, and a locknut 30 for axially moving the nose ring 23 into compressive engagement with the collet 11 is provided with a bearing assembly 45 disposed between the nose ring 23 and the collet 11 which loads compressive forces in a direction which is advantageously parallel to the axis of rotation A of the chuck. Both the locknut 30 and the nose ring 23 include flange portions 27, 43 that confront each other with opposing surfaces 47, 49 that are complementary in shape to the spherical profile of the ball bearings 50 and which traverse a line L parallel to the axis of rotation A of the chuck. The collet chuck 1 further includes O-rings 61, 65 disposed between the nose ring 23 and the locknut 30 both in front of and behind the ball bearings 50 for sealing the bearing assembly 45 against dust and debris and retaining lubricant. Finally, the portion of the nose ring 23 which wedgingly engages the collet 11 to compress it inwardly is undercut with a groove 72 in order to enhance the compliance between the nose ring 23 and the collet 11, thus providing a more uniform radial compressive force around the collet 11 which in turn results in improved gripping characteristics.

21 Claims, 3 Drawing Sheets

COLLET CHUCK HAVING PARPALLEL FORCE LOADED BEARING

BACKGROUND OF THE INVENTION

This invention generally relates to collet chucks, and is specifically concerned with a collet chuck having an anti-friction bearing between its nose ring and locknut that is loaded in a direction parallel with respect to the axis of rotation of the chuck.

Collet chucks having anti-friction bearings are well known in the prior art. Such chucks are typically comprised of a housing which is detachably connectable to the spindle of a turning tool which includes an opening for receiving a collet. The collet includes a series of parallel, longitudinally oriented cuts around its body for rendering it radially compressible around the shank of a tool, and terminates in a frustro-conically shaped outer edge which defines a follower surface. The outer edge of the collet projects out of the opening in the chuck housing, and is surrounded by a nose ring having a cam surface. The cam surface of the nose ring is complementary in shape to the follower surface of the collet, and wedgingly compresses the end of the collet radially inwardly when driven axially toward the housing of the chuck. The inner surface of the radially compressed collet then grips the shank of a rotatable cutting tool such as a drill or a milling cutter.

To drive the nose ring in the axial direction to radially compress the collet, a generally tubular locknut is provided around the chuck body. The inner diameter of one end of the locknut is threadedly engaged to the chuck body, and the opposite end of the locknut is rotatably connected to the nose ring by means of a bearing assembly. The use of a bearing assembly to reduce friction between the nose ring and the locknut is required in precision collet chucks designed to firmly grip the shanks of large cutting tools that are rotated at high speeds. Such collet chucks must use thick-walled collets that require large radial forces in order to overcome their resiliency and firmly engage them against the shank of a cutting tool. Without an anti-friction bearing between the nose ring and the locknut, the amount of torque required to screw the locknut to an axial position on the chuck housing for adequately compressing the collet would likely exceed the strength of the average machine tool operator. Even if it were possible for the operator to manually adequately turn the locknut, the large amount of torque that would have to be manually applied would, at the very least, greatly impede quick tool changes. To reduce the torque between the locknut and nose ring to a level that can be easily manually applied by the machine operator, prior art chuck collets have employed either needle bearings or ball bearings. Ball bearing arrangements are generally preferred by machine operators over needle bearing arrangements since the bottom portion of the locknuts used in conjunction with ball bearings do not obscure the outer edge of the collet as locknuts used with needle bearings do. However, despite this advantage, the applicants have noted a number of shortcomings in the designs of ball bearing chucks which could bear improvement.

For example, in virtually all of the prior art collet chucks that utilize ball bearings, the compressive forces transmitted between the locknut and the nose ring are applied at an angle which is non-parallel to the axis of rotation of the chuck housing. An example of such oblique loading across the ball bearings may be seen in U.S. Pat. No. 3,652,100. Because of the high compressive forces that the screw thread of the locknut is capable of generating in the axial direction, the angular orientation of the ball bearings in the nose ring of this particular chuck causes the bearings to generate a hoop stress to the bottom edge of the locknut adjacent to the bearings. Over time, these hoop stresses can deform the cylindrical profile of the locknut and interfere with its smooth functioning.

In another type of collet chuck disposed in U.S. Pat. No. 3,365,204, the ball bearings are disposed in opposing grooves present in the nose piece and locknut which are radially oriented such that the ball bearings serve to "key" the locknut and nose ring together. Unfortunately, in this design, the axially-oriented shear forces applied to the outer and inner halves of each of the ball bearings will tend to distort the shape of these grooves over time, which in turn will impair the smooth operation of the bearing. Even more importantly, this particular design requires that the ball bearings be inserted through a threaded bore located in the sidewall of the locknut to effect the assembly of the chuck. The bore is plugged by a set screw after all the ball bearings have been inserted into the opposing grooves. The necessity of installing the ball bearings through such a bore not only makes the assembly and disassembly of this collet chuck tedious and time consuming; it further creates a weight imbalance at a point on the circumference of the locknut which must be compensated for by some kind of balancing mechanism if the collet chuck is rotated at high speeds.

Still another shortcoming associated with such prior art collet chucks is the fact that in some of the grooves of the bearing assemblies, the ball bearings make only a point or a line contact with the surface of the grooves. Such point or line contact generates concentrated stresses in the ball recess in the nose ring and locknut which can ultimately distort the shape of the grooves, and again interfere with the smooth functioning of the bearing.

Additionally, in general, the cam surfaces of the nose ring do not always perfectly match the frustro-conical shape of the follower surfaces on the outer edge of the collet in many such prior art collet chucks. Such a mismatch in the shape of the cam and follower surfaces can in turn result in a nonuniform radial compression of the collet, which in turn can cause nonuniform gripping forces around the shank of the tool. Finally, there is no provision in such prior art collet chucks for preventing dust and debris from entering the bearing assembly between the nose ring and locknut, or for retaining lubricant therein, which again can impede smooth functioning and lead to life-shortening wear.

Clearly, there is a need for an improved collet chuck in which the transmission of reactive forces through the ball bearings does not create unwanted distortions or wear patterns in either the locknut, or the grooves that the bearings roll in. Ideally, such a collet chuck could be easily assembled without the need for a special ball-receiving bore in the wall of the locknut, which not only slows assembly, but further creates unwanted imbalances in the collet chuck. Such a collet chuck should also have some provision for insuring a uniform engagement between the cam surfaces of the nose ring and the follower surfaces around the outer edge of the collet, and some sort of means for both preventing the entry of dust and debris into the bearing assembly and retaining lubricant within the ball track space.

SUMMARY OF THE INVENTION

The invention is a collet chuck which fulfills all of the aforementioned criteria while avoiding the shortcomings associated with the prior art. The collet chuck of the invention generally comprises a collet disposed in a rotatable housing, a nose ring disposed around the collet and having a cam portion for radially compressing the resilient outer edge of the collet, a locknut disposed around and threadedly engaged to the chuck housing that has a flange portion that confronts a flange portion of the nose ring for applying compressive forces thereto in a direction which is parallel to the axis of rotation of the chuck housing. Most importantly, the collet chuck further comprises a bearing assembly for transmitting the parallel compressive force between the confronting flange portions of the nose ring and locknut. To this end, the bearing assembly includes opposing grooves on the confronting flanges of the locknut and nose ring, respectively, and a plurality of ball bearings disposed between these grooves wherein each groove has, in cross section, an arcuate portion complementary in shape to the ball bearings that traverses a line parallel to the axis of rotation of the chuck housing, and a snap ring of balanced design.

In the preferred embodiment, the arcuate portions of the grooves define the entire opposing surfaces of the opposing flange portions of the nose ring and locknut. Additionally, the arcuate portion of each groove preferably circumscribes at least 100° around the circumference of the ball bearings. The complementary shape of the arcuate portions with respect to the surface of the ball bearings, coupled with their 100° extent, causes the compressive forces to be transmitted from the locknut to the nose ring through broad surface-to-surface contact between the ball bearings and the surfaces of the grooves. Preferably, at least 10° of the 100° extent of each of the grooves is disposed on one side of a line parallel to the axis of rotation of the chuck housing to insure that these compressive forces will be axially transmitted in a parallel manner.

To insure that the nose ring will uniformly apply a compressive radial force around the follower surface on the collet, a compliance groove is provided underneath the cam surface of the nose ring to render the cam surface more readily conformable to the follower surface of the collet. The provision of such a groove creates a thinner, skirt-shaped cam element in the nose ring that has a relatively compliant free end.

To prevent dust and debris from entering the bearing assembly and to retain lubricant, a pair of O-rings are disposed between adjacent surfaces of the nose ring and locknut both in front of and behind the ball bearings. The O-rings are preferably formed from an elastomer having high abrasion resistance and low friction, such as polyurethane, for long wear characteristics.

Finally, because the flange-like portions of the nose ring and locknut are dimensioned so that the nose ring is freely installable in the locknut without mechanical interference, the bearing assembly of the invention may be quickly put together by seating the first of the two O-rings in a groove in the locknut, and then placing the ball bearings in their respective groove in the locknut, seating the second of the two O-rings, dropping the nose ring into place over the ball bearings, and then installing a snap ring over the nose ring in order to secure it in place over the ball bearings. The locknut may then be screwed over the end of the threaded chuck body.

BREIF DESCRIPTION OF THE DRAWINGS

FIG. 1 is a side, cross-sectional view of the collet shuck of the invention;

FIG. 2 is an enlargement of one side of the lock nut, nose, ring, and ball bearings of the collet chuck illustrated in FIG. 1, showing in particular the shape of the ball bearing receiving groove in both the nose ring and the lock nuts; and FIG. 3 is an exploded, partial cross-sectional view of the nose ring, lock nut, and bearing assembly of the inventive collet chuck, illustrating the simplicity and speed with which these components may be assembled or disassembled.

DETAILED DESCRIPTION OF THE PREFERRED EMBODIMENT

Figure 1:
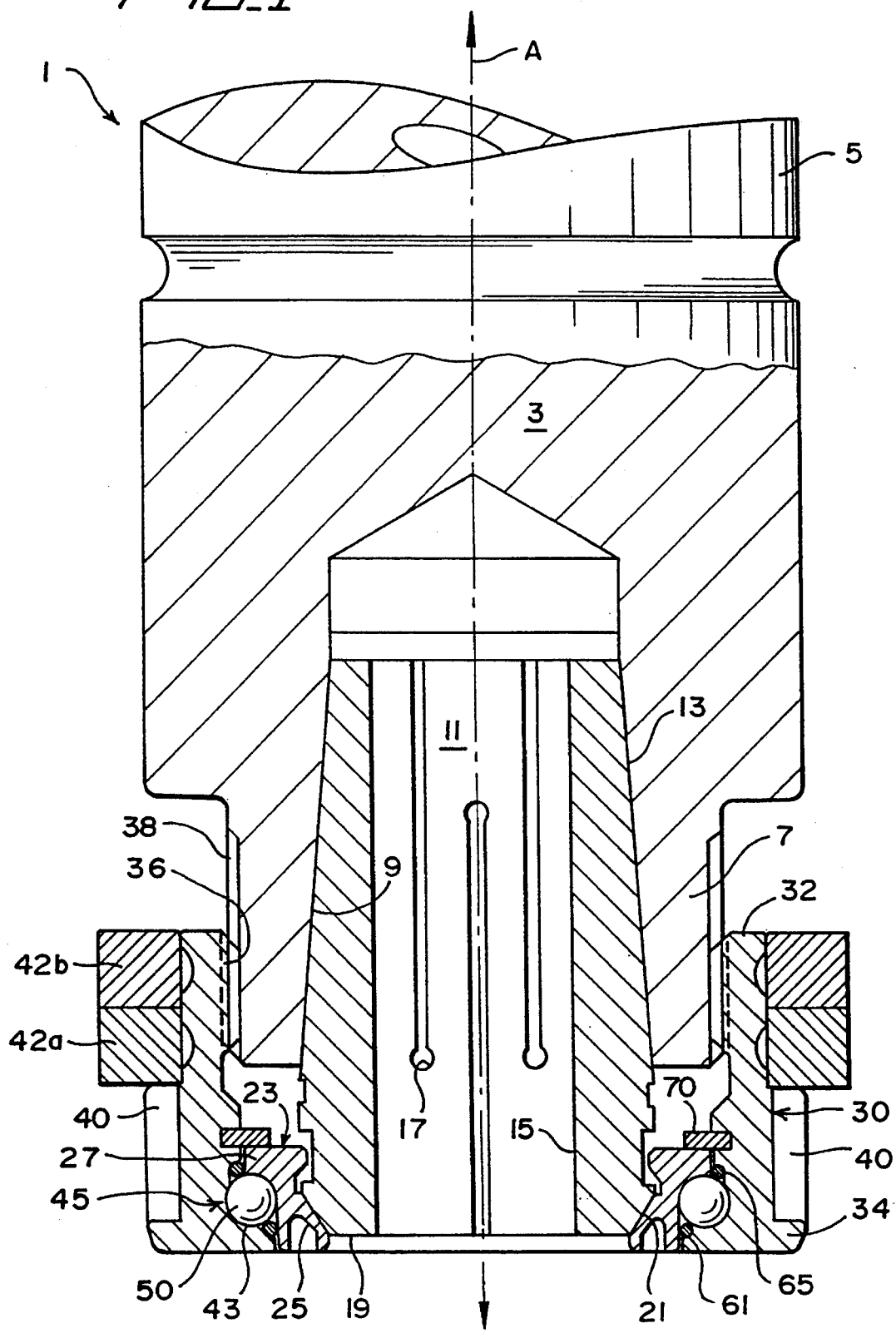

With reference now to FIG. 1, wherein like numerals designate like components throughout all the several figures, the collet chuck 1 of the invention generally comprises a cylindrical housing 3 that holds a collet 11 which is radially compressible around a tool shank (not shown) by the combination of a nose ring 23 and a locknut 30. As will be described in detail the bearing assembly 45 disposed between the nose ring 23 and locknut 30 not only reduces friction, but advantageously transmits compressive forces in a parallel manner with respect to an axial direction to avoid the application of potentially distortive hoop stresses.

Turning now to a more detailed description of the various components, cylindrical housing 3 is rotatable about an axis A and includes a proximal end 5 and distal end 7. Proximal end 5 is detachably connectable to a tool spindle by way of a tool coupling mechanism (not shown), and distal end 7 includes a concentrically disposed, tapered opening 9. The opening 9 receives a collet 11 having an outer surface 13 which is complementary in shape thereto, and an inner surface 15 which is cylindrically shaped for receiving and engaging the shank of a tool such as a drill or milling cutter (not shown). The collet 11 includes a plurality of alternating longitudinal cuts 17 around its circumference for rendering the body of the collet radially compressible. The distal end 19 of the collet 11 terminates in a frustro-conical follower surface 21 around its outer edge.

Nose ring 23 includes a cam portion 25 having a surface that is complementary in shape to the frustro-conical follower surface 21 of the collet 11. Nose ring 23 further includes a flange portion 27 as shown. Locknut 30 is tubularly shaped, and includes a lower end 32 that circumscribes the nose ring 23 and an upper end 34 having screw threads 36 on its inner diameter that engage screw threads 38 present on the outer diameter of the distal end 7 of the housing 3. Preferably, the screw threads 36, 38 are acme-type pilot threads which accurately, consistently, and smoothly operate to move the nose ring 23 along the axis A when the locknut 30 is manually turned. To facilitate the grip of an operator around the locknut 30, a plurality of spanner slots or wrench grip recesses 40 are provided in the positions shown. Additionally, a pair of balancing rings 42a,b may be provided around the upper end 34 of the locknut 30. The balance rings 42a,b can be adjusted to correct imbalances in the collet chuck 1 which could otherwise result in unwanted vibration and possible movement of any tool secured in the collet 11. Such balancing rings are described and claimed in U.S. Pat. No. 5,074,723 assigned to Kennametal, Inc., the entire specification of which is incorporated herein by reference. The lower end of the locknut 30 terminates in a flange portion 43 which opposes and confronts the flange portion 27 of the nose ring 23.

Figure 2:
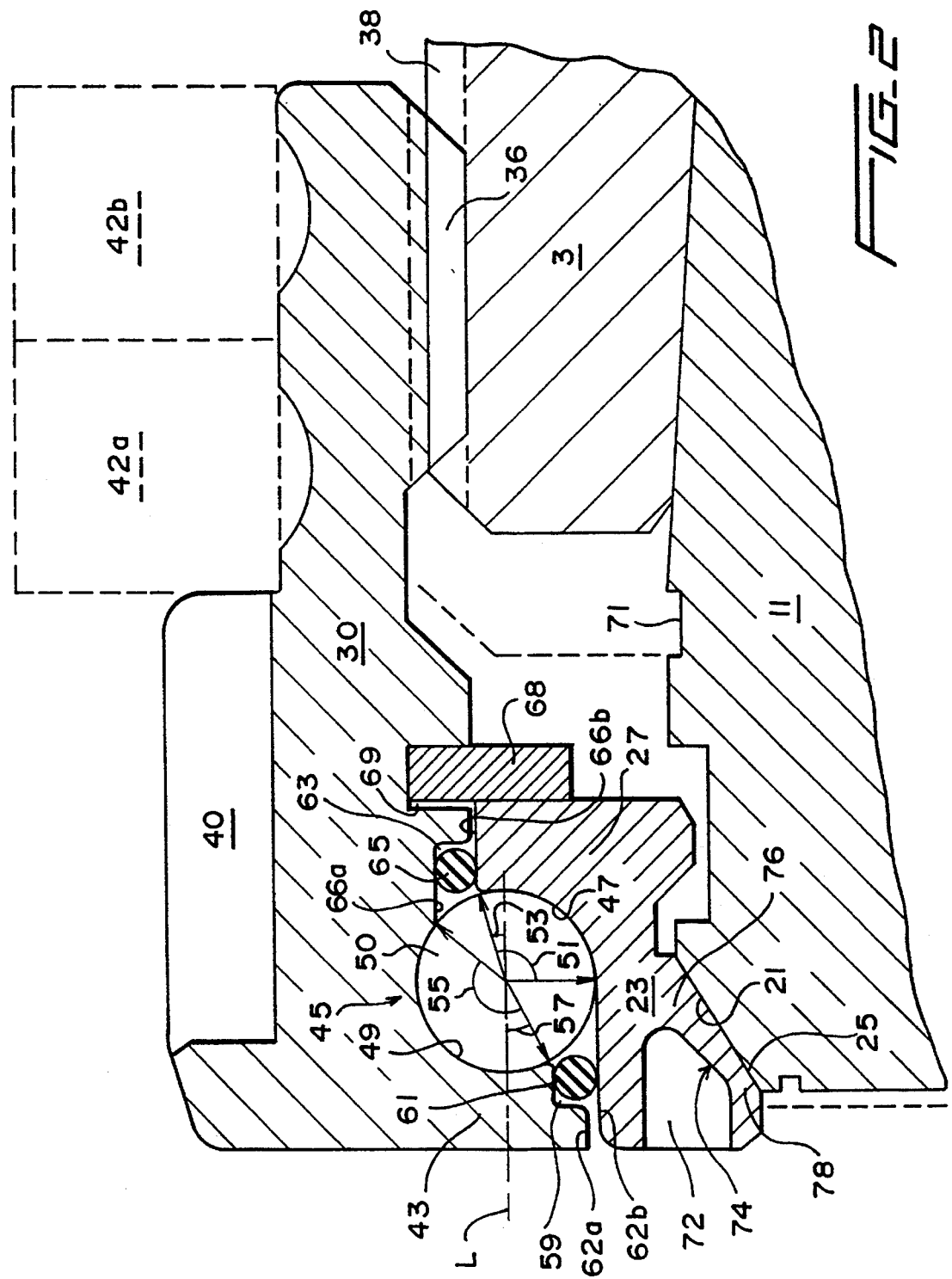

With reference now to FIGS. 1 and 2, the collet chuck 1 includes a bearing assembly 45 for reducing friction between the locknut and nose ring 23 when the locknut 30 is turned in order to axially compress the cam portion 25 of the nose ring 23 against the follower surface 21 of the collet 11, and for transmitting these compressive forces along a line parallel to the axis of rotation A. As has been indicated earlier, the parallel transmission of these forces along axis A avoids unwanted hoop stresses and shear stresses in the nose ring 23 and locknut 30 which distort or cause excessive wear in these components. To this end, the bearing assembly 45 includes grooves 47 and 49 which define the confronting surfaces of flange portions 27 and 43 of the nose ring 23 and locknut 30, respectively. Both of these grooves 47, 49 are complementary in shape to the curvature of a plurality of ball bearings 50 disposed therebetween. The complementary shape of these grooves 47, 49 with that of the curvature of the ball bearings 50 advantageously transmits compressive forces between the nose ring 23 and locknut 30 by means of a surface as opposed to a point or a line between the ball bearings and the grooves.

As may best be seen with respect to FIG. 2, the cross-sectional shape of the groove 47 on the flange portion 27 of nose ring 23 is an arc 51 subtending approximately 100°, of which about 10° forms an over-center portion 53 which traverses, or extends across, in a counterclockwise direction, a line L parallel with the axis of rotation A and passing through the center of ball bearing 50. The 100° extent of the arc 51 insures broad surface contact between the complementarily shaped surface of the ball bearings 50 and the groove 47. The over-center portion 53 of the arc 51 insures that compressive forces generated by the locknut 30 will be transmitted to the ball bearings 50 through their center portions with respect to the line L, thereby avoiding the generation of laterally-oriented force components which can create unwanted hoop or shear stresses on the nose ring 23. The cross section of the groove 49 that defines the confronting surface of the flange portion 43 of the locknut 30 is an arc 55 subtending an angle of approximately 153° of which about 26° forms an over-center portion 57 which transverses, or extends across, in a counterclockwise direction, a line L parallel with the axis of rotation A. Again, the 153° extent of the arc 55 insures a broad surface-to-surface contact between the bearings 50 and the groove 49 of the locknut 30, while the 26° over-center portion 57 insures that the compressive forces generated by the locknut 30 will be transmitted through the ball bearings 50 along the line L which is parallel to the axis of rotation A. Hence, the shape and orientation of the groove 49 of the locknut 30 insures that no unwanted hoop or shear forces will be applied to the flange portion 43 of the locknut 30 by the reactive forces of the ball bearings 50 when the locknut 30 is manually screwed upwardly toward the proximal end 5 of the housing 3.

To prevent dust and debris from entering and damaging the bearing assembly 45, and for the retention of lubricant, the collet chuck 1 of the invention further includes O-rings 61 and 65 both in front of and behind the ball bearings 50 as shown. An annular recess 59 circumscribes the inner edge of the lower end of the locknut 30 for receiving the O-ring 61, which is preferably formed from a resilient, low friction and wear resistant elastomer such as polyurethane. The crosssectional diameter of the O-ring 61 is chosen so that when the O-ring 61 is seated into the annular recess 59 in the position illustrated in FIG. 2, a seal is created between adjacent front surfaces 62a,b of the locknut 30 and nose ring 23, respectively. Similarly, a further annular recess 63 is provided in the lower end 32 of locknut 30 just above the bearing groove 49. Again, the cross-sectional diameter of a second O-ring 65 is chosen such that it creates a fluid tight seal between adjacent surfaces 66a,b which will prevent the intrusion of unwanted dust and debris into the bearing assembly 45 while retaining lubricant. The provision of an O-ring 65 that seals the back side of the bearing assembly 45 from such dust and debris is particularly advantageous, since errant debris containing liquid from the coolant sprays used during machining operations not only impinges on the front face of the collet chuck 1, but enters into the locknut bearing area as a result of the coolant pressure.

A snap ring 68 of balanced design which is resiliently seatable in a rectangular groove 69 in the locknut 30 holds the bearing assembly 45 formed between the nose ring 23 and locknut 30. As will be discussed in more detail hereinafter, the use of a single, simple snap ring 68 of balanced design to hold the nose ring 23 and locknut 30 together facilitates not only the assembly, but the disassembly of the bearing assembly 45.

Turning now to a more detailed discussion of the advantageous features of the nose ring 23, an annular compliance groove 72 is provided in the cam portion 25, and defines a skirt-shaped cantilevered cam element 74. While the cam element 74 includes a fairly rigid proximal portion 76, it also includes a distal portion 78, which is much more compliant than the cam portion 25 without compliance groove 72. Accordingly, when the machine operator turns the locknut 30 in order to axially move the nose ring 23 such that the cantilever cam element 74 wedgingly engages the frustro-conical follower surface 21 of the collet 11 to radially compress it inwardly, the compliant characteristics of the flexible distal portion 78 of the cam element 74 results in uniform contact between the cam and follower surfaces and results in improved gripping characteristics. Such uniform contact in turn uniformly radially compresses the collet 11 inwardly in such a manner that its inner surface 15 uniformly engages and grips a tool shank (not shown) throughout its entire circumference.

Figure 3:
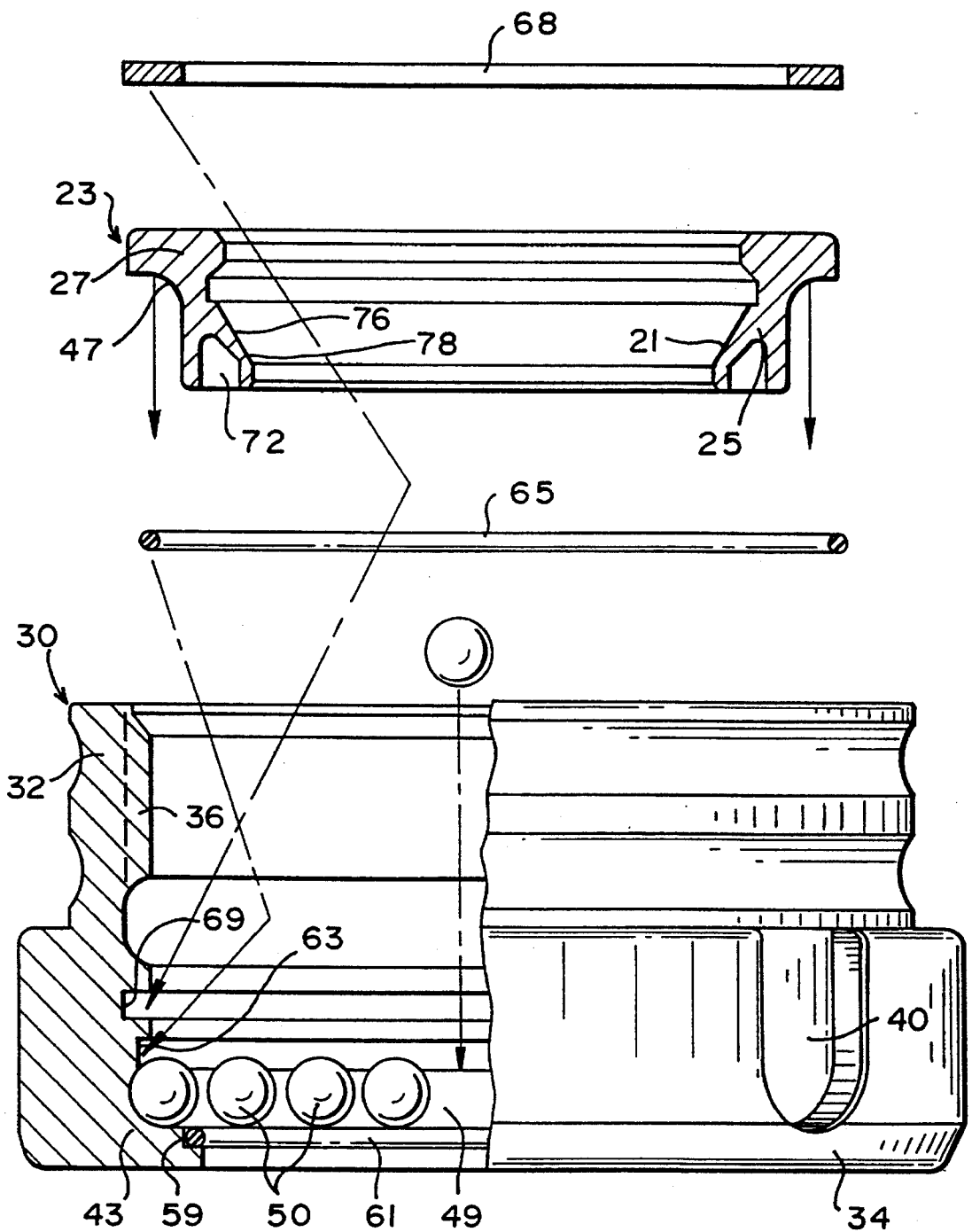

FIG. 3 illustrates the simplicity and speed with which the nose ring 23, locknut 30, and bearing assembly 45 may be assembled or disassembled. To assemble, the bottom most O-ring 61 is first seated in the annular recess 59 of the locknut 30. Next the locknut 30 is placed on a level surface, and the ball bearings 50 are placed into the groove 49. The relatively large, approximately 153° arcuate extent of the groove 49 in combination with the approximately 26° extent of the over-center portion 57 prevents the balls 50 from easily falling out of the groove 49 as they are packed therein. Next, the rear O-ring 65 is seated into the annular recess 63. Nose ring 23 may then be easily dropped over the ball bearings 50 since the outer diameter of the flange portion 27 is smaller than the inner diameter of any portion of the locknut 32 above the ball bearings 50. Finally, snap ring 68 is seated into the rectangularly shaped groove 69, and the tubular locknut 30 is positioned around the distal end 7 of the housing and screwed thereon by means of inter-engaging threads 36 and 38. The ease with which the nose ring 23, locknut 30, and bearing assembly 45 are assembled and disassembled makes it easy to periodically clean the bearing assembly 45 if necessary, and to replace O-ring 59 and 65, or to perform any other maintenance or replacement operation on these components.

While the invention has been described with respect to a preferred embodiment, variations, improvements, and modifications to this preferred embodiment will become evident to persons skilled in the art. All such variations, improvements, and modifications are encompassed within the scope of the invention, which is limited only by the claims appended hereto.

What is claimed is:

1. A collet chuck for radially compressing a resilient edge of a collet concentrically disposed in a housing connected and rotatable with a spindle about an axis of rotation, comprising:

(a) a nose ring disposed around said collet having a confronting portion and having cam portion for radially compressing said resilient edge;

(b) a locknut disposed around said nose ring, threadedly engaged with said housing and having a confronting portion facing said confronting portion of said nose ring along the axis of rotation of said housing for applying an axially directed compressive force to said nose ring so that said cam portion of said nose ring radially compresses said resilient edge, and (c) a bearing means for transmitting said compressive force between said axially confronting portions throughout an area in a direction parallel to said axis of rotation, including first and second opposing grooves on said confronting locknut and nose ring portions, respectively, and a plurality of ball bearings disposed directly against said groves, wherein each groove has in cross section, an arcuate portion complementary in shape to said ball bearings that transverses a line that is parallel to said axis and passes through the center of each ball bearing.

2. A collet chuck as described in claim 1, wherein said arcuate portion of said first groove defines the surface of the confronting portion of the locknut that faces said portion of said nose ring.

3. A collet chuck as described in claim 1, wherein said arcuate portion of said second groove defines the surface of the confronting portion of the nose ring that faces said portion of said locknut.

4. A collet chuck as described in claim 1, wherein said arcuate portion of each groove circumscribes at least 100° around the circumference of said ball bearings.

5. A collet chuck as described in claim 4, wherein at least 10° of said 100° of each arcuate portion extends beyond an axial line traversing the center of said ball bearings.

6. A collet chuck as described in claim 1, further comprising means for obstructing dust and debris from entering a space between said mutually opposing grooves on said confronting locknut and nose ring portions and for retaining lubricant within said space.

7. A collet chuck as described in claim 6, wherein said dust obstructing means includes an O-ring.

8. A collet chuck as described in claim 1, wherein said nose ring is freely removable from said locknut when said locknut is removed from said housing, and further comprising a balanced snap ring for retaining said nose ring in a confronting position with respect to said locknut.

9. A collet chuck as described in claim 1, further comprising means for rendering said cam portion of said nose ring compliant with respect to said radially resilient edge of said collet.

10. A collet chuck as described in claim 9, wherein said compliance means includes a groove circumscribing an outer edge of the nose ring located beneath said cam portion for affording compliant resiliency to said cam portion.

11. A collet chuck for radially compressing a resilient edge of a collet disposed in a housing rotatable about an axis of rotation, comprising:

(a) a nose ring disposed around said collet and having a cam portion with a tapered surface for wedgingly and radially compressing said resilient edge;

(b) a locknut disposed around said nose ring and including a portion that captures and axially confronts a portion of said nose ring, said locknut being threadedly engaged to said housing for applying an axially directed compressive force to said nose ring when rotated relative to said housing so that said cam portion radially compresses said resilient collet edge;

(c) a bearing means for transmitting said compressive force between said axially confronting portions throughout an area in a direction parallel to said axis of rotation, including first and second opposing grooves on said confronting locknut and nose ring portions, respectively, and a plurality of ball bearings disposed between said grooves, wherein each groove has in cross section, an arcuate portion complementary in shape to said ball bearings that traverses a line that is parallel to said axis, and passes through the center of each ball bearing, and (d) means circumscribing an outer edge of said nose ring for affording compliant resiliency to said cam portion.

12. A collet chuck as described in claim 11, wherein said arcuate portion of each groove circumscribes at least 100° around the circumference of said ball bearings.

13. A collet chuck as described in claim 12, wherein at least 10° of said 100° of each arcuate portion extends beyond an axial line traversing the center of said ball bearings.

14. A collet chuck as described in claim 11, further comprising means for obstructing dust and debris from entering the space between said first and second opposing grooves of said bearing means, and retaining lubricant within said space, including an O-ring disposed between adjacent edges of said nose ring and locknut.

15. A collet chuck as described in claim 14, wherein said O-ring is disposed between a surface of said confronting portion of said locknut and an adjacent surface edge of said nose ring.

16. A collet chuck as described in claim 14, wherein said dust and debris obstructing means includes a first O-ring disposed between an edge of said confronting portion of said locknut and an adjacent edge of said nose ring, and a second O-ring disposed between an edge of said confronting portion of said nose ring and an adjacent edge of said locknut such that said space between said opposing grooves is completely sealed from dust and debris in all directions, and is able to retain lubricant.

17. A collet chuck as described in claim 11, wherein said nose ring is freely insertable into an inner diameter of said locknut in a position wherein the confronting portion of said locknut confronts and captures said portion of said nose ring to facilitate the assembly of the bearing means of the chuck.

18. A collet chuck as described in claim 17, wherein the groove of said opposing portion of said locknut functions to receive and retain said ball bearings during assembly of the bearing means without the need for a bearing plug, and said nose ring is freely insertable into said locknut until the groove on said portion of said nose ring engages and captures said ball bearings.

19. The collet chuck as described in claim 11, wherein said locknut threadedly engages an outer diameter of the housing by means of pilot threads for maintaining rotary balance in said chuck.

20. A collet chuck for radially compressing a resilient edge of a collet disposed in a housing, rotatable about an axis of rotation, comprising:

(a) a nose ring disposed around said collet and having a cam portion with a tapered surface for wedging and radially compressing said resilient edge;

(b) a locknut disposed around said nose ring and including a portion that captures and axially confronts a portion of said nose ring, said locknut being threadingly engaged to said housing for applying an axially directed compressive force to said nose ring when rotated relative to said housing so that said cam portion radially compresses said resilient collet edge;

(c) a bearing means for transmitting said compressive force between said axially confronting portions throughout an area in a direction parallel to said axis rotation, including first and second opposing groves on said confronting locknut and nose ring portions, respectively, and a plurality of ball bearings disposed between said grooves, wherein each groove has, in cross section, an arcuate section complementary in shape to said ball bearings that transverses a line parallel to said axis, and wherein said arcuate portions of said grooves define the surfaces of the confronting portions; and (d) means for rendering said cam portion of said nose ring compliant with respect to said radially resilient edge of said collet.

21. A collet chuck as described in claim 20, wherein said nose ring is freely insertable into an inner diameter of said locknut in a position wherein the confronting portion of said locknut confronts and captures said portion of said nose ring to facilitate the assembly of the bearing means of the chuck.

* * * * *